United States Patent
Aiso

(10) Patent No.: US 12,429,595 B2
(45) Date of Patent: Sep. 30, 2025

(54) VEHICULAR SENSING SYSTEM AND VEHICLE

(71) Applicant: KOITO MANUFACTURING CO., LTD., Tokyo (JP)

(72) Inventor: Yoshiaki Aiso, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 1079 days.

(21) Appl. No.: 17/431,972

(22) PCT Filed: Jan. 20, 2020

(86) PCT No.: PCT/JP2020/001731
§ 371 (c)(1),
(2) Date: Jan. 28, 2022

(87) PCT Pub. No.: WO2020/170678
PCT Pub. Date: Aug. 27, 2020

(65) Prior Publication Data
US 2022/0206153 A1   Jun. 30, 2022

(30) Foreign Application Priority Data
Feb. 18, 2019  (JP) .................... 2019-026547

(51) Int. Cl.
G01S 17/89 (2020.01)
B60R 11/00 (2006.01)
B60R 11/04 (2006.01)
G01S 17/86 (2020.01)

(52) U.S. Cl.
CPC ............. *G01S 17/89* (2013.01); *G01S 17/86* (2020.01); *B60R 2011/004* (2013.01); *B60R 11/04* (2013.01)

(58) Field of Classification Search
None
See application file for complete search history.

(56) References Cited

U.S. PATENT DOCUMENTS

2018/0052236 A1* 2/2018 Hoffman, Jr. ........... B60R 11/00
2018/0314259 A1  11/2018 Shami
2019/0302761 A1* 10/2019 Huang ................ G02B 27/017

FOREIGN PATENT DOCUMENTS

JP    H09-277887 A    10/1997
JP    2015-147486 A    8/2015
WO    2018-138584 A1   8/2018

OTHER PUBLICATIONS

First Office Action in corresponding Chinese Application No. 202080014924.0, dated Nov. 9, 2022 (14 pages).
International Search Report issued in International Application No. PCT/JP2020/001731, dated Feb. 10, 2020 (5 pages).
Written Opinion issued in International Application No. PCT/JP2020/001731, dated Feb. 10, 2020 (3 pages).

* cited by examiner

*Primary Examiner* — Luke D Ratcliffe
(74) *Attorney, Agent, or Firm* — Osha Bergman Watanabe & Burton LLP

(57) ABSTRACT

This vehicular sensing system provided to a vehicle comprises a frontward LiDAR unit and a rearward LiDAR unit. The frontward LiDAR unit and the rearward LiDAR unit are arranged on a rear surface of a vehicle body facing a road, and are configured to acquire point group data indicating the surrounding environment of the vehicle.

4 Claims, 3 Drawing Sheets

VEHICULAR SENSING SYSTEM AND VEHICLE

TECHNICAL FIELD

The present disclosure relates to a sensing system for a vehicle and a vehicle.

BACKGROUND ART

Currently, a research on an automatic driving technique of an automobile has been actively conducted in various countries, and legislation for allowing a vehicle (hereinafter, the "vehicle" refers to an automobile) to travel on a public road in an automatic driving mode has been studied in various countries. Here, a vehicle system automatically controls traveling of the vehicle in the automatic driving mode. Specifically, in the automatic driving mode, the vehicle system automatically executes at least one of steering control (control of an advancing direction of the vehicle), brake control, and accelerator control (control of braking, and acceleration or deceleration of the vehicle) based on information (surrounding environment information) that indicates a surrounding environment of the vehicle and is acquired from a sensor such as a camera or a radar (for example, a laser radar or a millimeter wave radar). On the other hand, in a manual driving mode to be described below, a driver controls traveling of the vehicle, as is cases of many related-art vehicles. Specifically, in the manual driving mode, the traveling of the vehicle is controlled according to an operation (a steering operation, a brake operation, and an accelerator operation) of the driver, and the vehicle system does not automatically execute the steering control, the brake control, and the accelerator control. A vehicle driving mode is not a concept that exists only in a part of vehicles, but a concept that exists in all vehicles including the related-art vehicles that do not have an automatic driving function, and the vehicle driving mode is classified according to, for example, a vehicle control method.

Therefore, it is expected in the future that a vehicle traveling in an automatic driving mode (hereinafter, referred to as an "automatic driving vehicle" as appropriate) and a vehicle traveling in a manual driving mode (hereinafter, referred to as a "manual driving vehicle" as appropriate) coexist on a public road.

As an example of the automatic driving technique, Patent Literature 1 discloses an automatic following travel system for a following vehicle to automatically follow a preceding vehicle. In the automatic following travel system, each of the preceding vehicle and the following vehicle includes a lighting system. Character information for preventing other vehicles from cutting in between the preceding vehicle and the following vehicle is displayed on the lighting system of the preceding vehicle, and character information indicating that the following vehicle automatically follows the preceding vehicle is displayed on the lighting system of the following vehicle.

Patent Literature 1: JP H09-277887 A

SUMMARY OF INVENTION

With the development of the automatic driving technique, it is necessary to dramatically increase detection accuracy of a surrounding environment of the vehicle. In this regard, mounting a plurality of different types of sensors (for example, a camera, a LiDAR unit, a millimeter wave radar, and the like) on a vehicle is currently being studied. For example, mounting a LiDAR unit and a camera on each of a front surface and a rear surface of a vehicle is currently being studied.

On the other hand, even if a plurality of sensors are provided in the vehicle so as to detect the surrounding environment at an entire periphery (360 degrees) of the vehicle, the plurality of sensors cannot detect an object such as a pedestrian and a motorcycle that is hidden behind another vehicle present around the vehicle. For example, a situation is also assumed in which a pedestrian hidden behind another vehicle suddenly jumps out in front of an own vehicle. Even in this situation, an automatic driving vehicle needs to instantly determine optimal vehicle control according to a behavior of the pedestrian.

In consideration of the above-described viewpoints, an object of the present disclosure is to provide a sensing system for a vehicle and a vehicle that are capable of detecting an object hidden behind another vehicle.

According to an aspect of the present disclosure, there is provided a sensing system for a vehicle that is provided a vehicle, and includes at least one LiDAR unit provided on a back surface of a vehicle body facing a road and configured to acquire point group data indicating a surrounding environment of the vehicle.

According to the above-described configuration, since the LiDAR unit is provided on the back surface of the vehicle body, the LiDAR unit can detect pedestrians, other vehicles, and the like present around the vehicle through a space between the back surface of the vehicle body and the road. Therefore, the LiDAR unit can detect an object such as a pedestrian or a motorcycle hidden behind another vehicle through a space between a back surface of a vehicle body of the other vehicle and the road.

The sensing system for a vehicle may further include at least one camera that is provided at a predetermined position of the vehicle body except for the back surface of the vehicle body and is configured to acquire image data indicating a surrounding environment of the vehicle.

According to the above-described configuration, the surrounding environment of the vehicle that cannot be detected by the LiDAR unit can be detected by the camera provided at the predetermined position of the vehicle body other than the back surface of the vehicle body. In this way, by using both the point group data and the image data, it is possible to improve the detection accuracy of the surrounding environment of the vehicle.

The vehicle sensing system may further include a LiDAR control unit configured to acquire surrounding environment information of the vehicle based on the point group data acquired from the LiDAR unit. The LiDAR control unit may be configured to delete information related to a tire of the vehicle from the surrounding environment information.

According to the above-described configuration, since the information related to the tire of the vehicle is deleted from the surrounding environment information, it is possible to prevent the tire from being detected as an object that is present around the vehicle.

The at least one LiDAR unit may include:
  a front LiDAR unit that is provided in a vicinity of a rear end of a pair of front tires of the vehicle in a front-rear direction of the vehicle and is provided in a vicinity of a center of the vehicle in a left-right direction of the vehicle, and
  a rear LiDAR unit that is provided in a vicinity of a rear end of a pair of rear tires of the vehicle in the front-rear direction and is provided in the vicinity of the center of the vehicle in the left-right direction.

According to the above-described configuration, when the two LiDAR units are provided on the back surface of the vehicle, it is possible to reduce a blind spot of the LiDAR units in the rear region of the vehicle.

A vehicle including the sensing system for a vehicle may be provided.

According to the above, it is possible to provide a vehicle capable of detecting an object hidden behind another vehicle.

According to the present disclosure, it is possible to provide a sensing system for a vehicle and a vehicle that are capable of detecting an object hidden behind another vehicle.

DESCRIPTION OF EMBODIMENTS

Figure 1A:
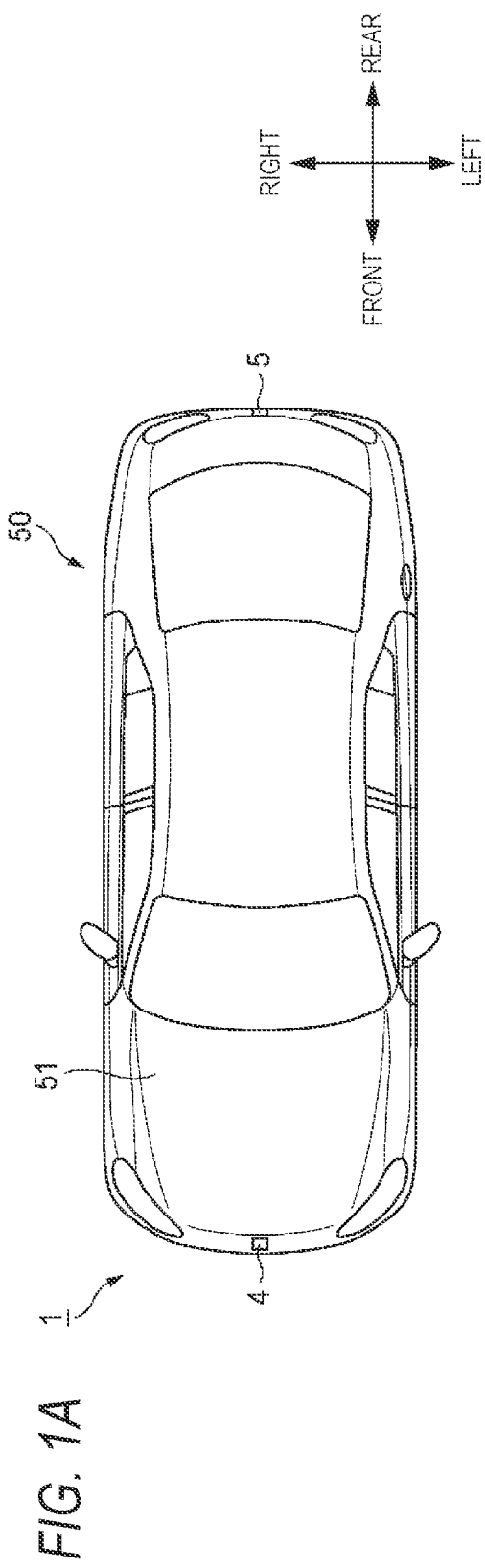
FIG. 1A is a plan view showing a vehicle according to an embodiment (hereinafter, simply referred to as the present embodiment) of the present invention as viewed from above.

Hereinafter, an embodiment of the present invention (hereinafter, referred to as the present embodiment) will be described with reference to the drawings. Dimensions of members shown in the drawings may be different from actual dimensions of the members for the sake of convenience of description.

In the description of the present embodiment, for convenience of description, a "left-right direction", an "upper-lower direction", and a "front-rear direction" may be referred to as appropriate. These directions are relative directions set for a vehicle 1 shown in FIGS. 1A and 1B. Here, the "left-right direction" is a direction including a "left direction" and a "right direction". The "upper-lower direction" is a direction including an "upper direction" and a "lower direction". The "front-rear direction" is a direction including a "front direction" and a "rear direction". Although not shown in FIGS. 1A and 1B, the upper-lower direction is a direction orthogonal to the left-right direction and the front-rear direction.

Figure 1B:
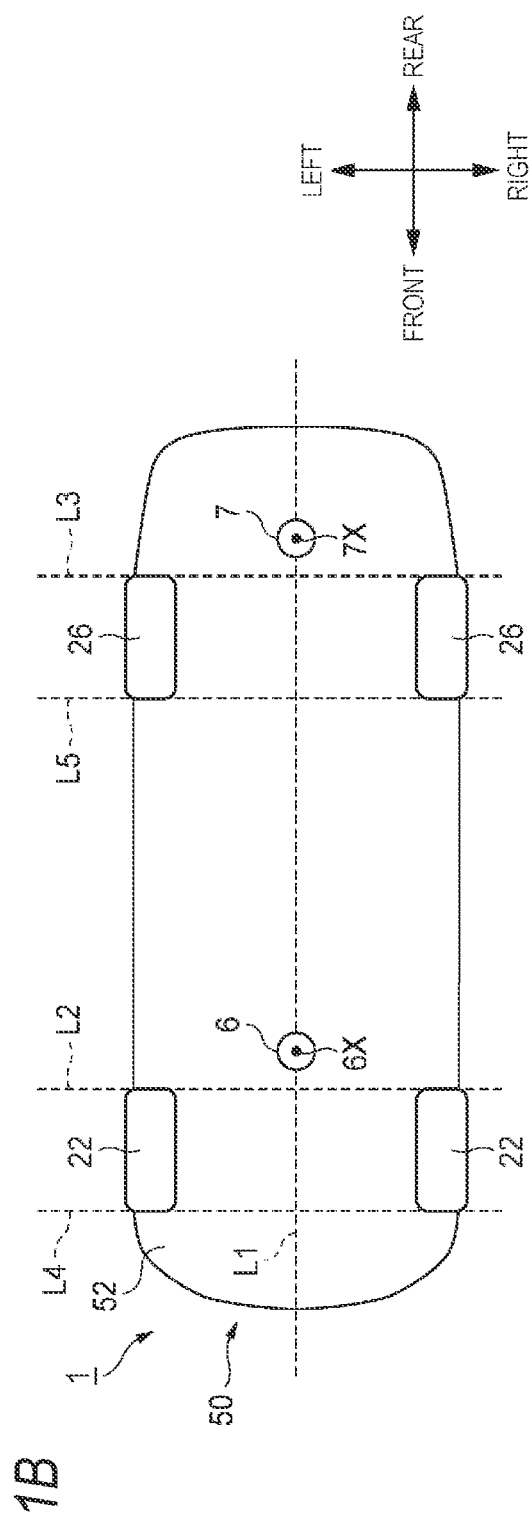
FIG. 1B is a plan view showing the vehicle according to the present embodiment as viewed from below.
Figure 2:
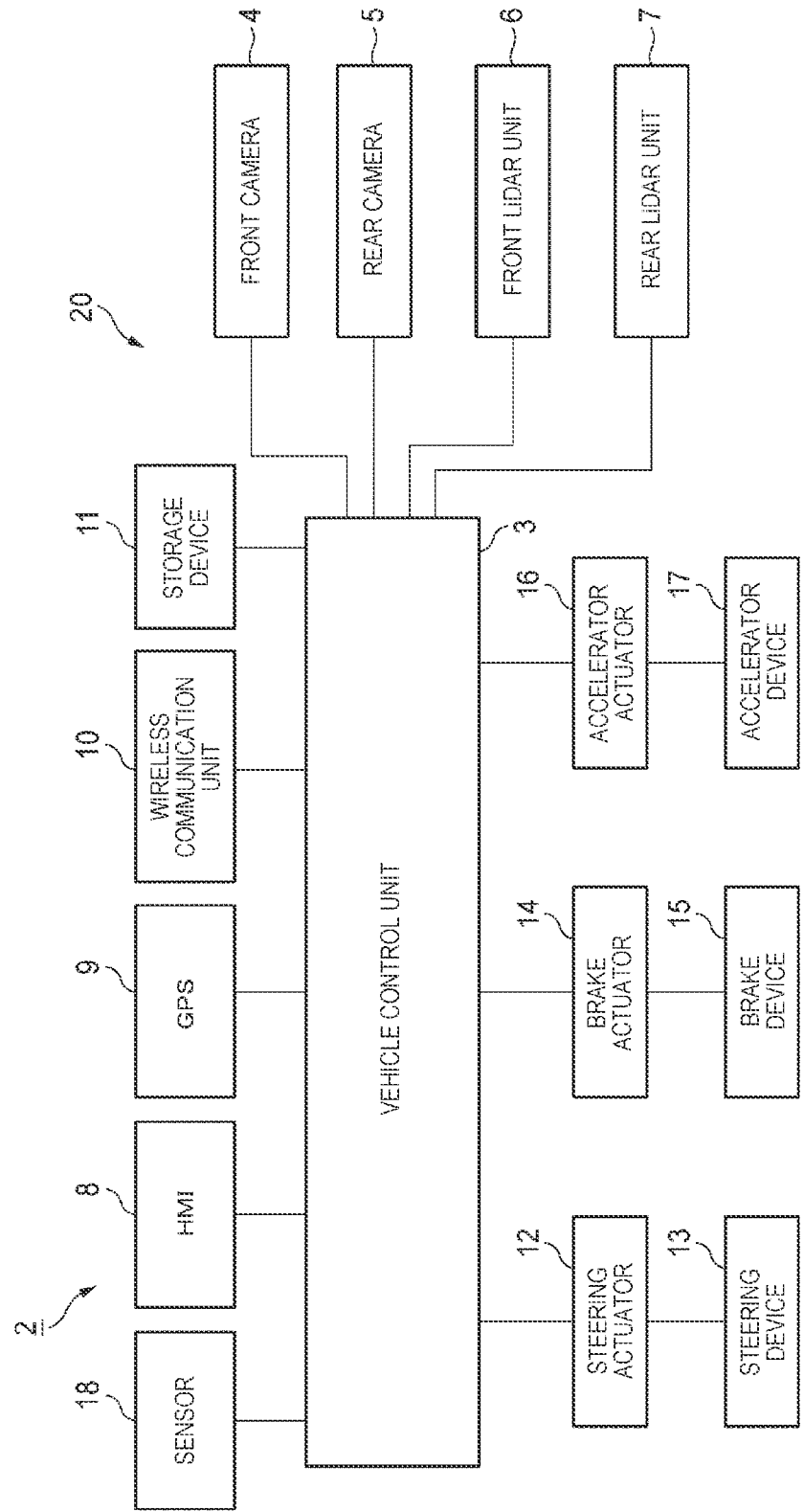
FIG. 2 is a block diagram showing a vehicle system according to the present embodiment.

First, the vehicle 1 and a vehicle system 2 according to the present embodiment will be described below with reference to FIGS. 1A, 1B, and 2. FIG. 1A is a plan view showing the vehicle 1 as viewed from above. FIG. 1B is a plan view showing the vehicle 1 as viewed from below. FIG. 2 is a block diagram showing the vehicle system 2 of the vehicle 1.

The vehicle 1 is a vehicle (an automobile) capable of traveling in an automatic driving mode, and includes the vehicle system 2. As shown in FIG. 2, the vehicle system 2 includes a vehicle control unit 3, a front camera 4, a rear camera 5, a front light detection and ranging (LiDAR) unit 6, and a rear LiDAR unit 7. The vehicle system 2 includes a sensor 18, a human machine interface (HMI) 8, a global positioning system (GPS) 9, a wireless communication unit 10, and a storage device 11. The vehicle system 2 further includes a steering actuator 12, a steering device 13, a brake actuator 14, a brake device 15, an accelerator actuator 16, and an accelerator device 17.

In the present embodiment, a vehicle sensing system 20 (hereinafter, simply referred to as a "sensing system") includes the front camera 4, the rear camera 5, the front LiDAR unit 6, the rear LiDAR unit 7, and the vehicle control unit 3. In this way, the sensing system 20 has a sensing function of the vehicle system 2.

The vehicle control unit 3 is configured to control traveling of the vehicle 1. The vehicle control unit 3 includes, for example, at least one electronic control unit (ECU). The electronic control unit includes a computer system (for example, a system on a chip (SoC)) including one or more processors and one or more memories, and an electronic circuit including an active element such as a transistor and a passive element. The processor includes, for example, at least one of a central processing unit (CPU), a micro processing unit (MPU), a graphics processing unit (GPU), and a tensor processing unit (TPU). The CPU may include a plurality of CPU cores. The GPU may include a plurality of GPU cores. The memory includes a read only memory (ROM) and a random access memory (RAM). The ROM may store a vehicle control program. For example, the vehicle control program may include an artificial intelligence (AI) program for automatic driving. The AI program is a program (a learned model) constructed by supervised or unsupervised machine learning (in particular, deep learning) using a multi-layer neural network. The RAM may temporarily store a vehicle control program, vehicle control data, and/or surrounding environment information indicating a surrounding environment of the vehicle. The processor may be configured to load a program that is designated from various vehicle control programs stored in the ROM onto the RAM and execute various types of processing in cooperation with the RAM. The computer system may be a non-von Neumann computer such as an application specific integrated circuit (ASIC) or a field-programmable gate array (FPGA). Further, the computer system may be a combination of a von Neumann computer and a non-von Neumann computer.

The vehicle control unit 3 functions as a camera control unit configured to control the front camera 4 and the rear camera 5, and also functions as a LiDAR control unit configured to control the front LiDAR unit 6 and the rear LiDAR unit 7. In particular, the vehicle control unit 3 is configured to acquire surrounding environment information in a front region of the vehicle 1 based on image data transmitted from the front camera 4 and/or point group data transmitted from the front LiDAR unit 6. The vehicle control unit 3 is configured to acquire surrounding environment information in a rear region of the vehicle 1 based on image data transmitted from the rear camera 5 and/or point group data transmitted from the rear LiDAR unit 7. Here, the surrounding environment information may include information related to an object that is present outside the vehicle 1. For example, the surrounding environment information may include information related to an attribute of the object and information related to a distance, a direction, and/or a position of the object with respect to the vehicle 1.

As shown in FIG. 1A, the front camera 4 is provided on a front side of a front surface 51 of a vehicle body 50. Here, the vehicle body 50 refers to a part of the vehicle 1 excluding tires 22, 26 shown in FIG. 1B. The front camera 4 is configured to acquire image data indicating a surrounding environment in the front region of the vehicle 1. The rear camera 5 is provided on a rear side of the front surface 51 of the vehicle body 50. The rear camera 5 is configured to acquire image data indicating a surrounding environment in the rear region of the vehicle 1. The front camera 4 and the rear camera 5 include an imaging element such as a charge-coupled device (CCD) or a complementary metal oxide semiconductor (MOS)(CMOS). The front camera 4 and the rear camera 5 may be a monocular camera or a stereo camera.

The front LiDAR unit 6 and the rear LiDAR unit 7 (hereinafter, may be simply referred to as a "LiDAR unit") acquire information related to time of flight (TOF) ΔT1 of laser light (an optical pulse) at each emission angle (a horizontal angle θ and a vertical angle φ) of the laser light. The LiDAR unit can acquire, based on the information related to the time of flight ΔT1 at each emission angle, information related to a distance D between the LiDAR unit at each emission angle and an object present outside the vehicle 1.

Time of flight ΔT1=time t1 at which laser light returns to LiDAR unit−time t0 at which LiDAR unit emits laser light In this way, the LiDAR unit can acquire the point group data indicating the surrounding environment of the vehicle 1.

The LiDAR unit includes, for example, a light emitting unit configured to emit laser light, an optical deflector configured to perform scanning with the laser light in a horizontal direction and a vertical direction, an optical system such as a lens, and a light receiving unit configured to receive the laser light reflected by an object. A peak wavelength of the laser light emitted from the light emitting unit is not particularly limited. For example, the laser light may be invisible light (infrared light) having a peak wavelength of approximately 900 nm. The light emitting unit is, for example, a laser diode. The light deflector is, for example, a micro electro mechanical systems (MEMS) mirror or a polygon mirror. The light receiving unit is, for example, a photodiode. The LIDAR unit may acquire the point group data without performing scanning with the laser light by the light deflector. For example, the LiDAR unit may acquire the point group data based on a phased array method or a flash method. The LiDAR unit may acquire the point group data by mechanically rotating and driving the light emitting unit and the light receiving unit.

The front LIDAR unit 6 is configured to acquire point group data indicating the surrounding environment in the front region of the vehicle 1. As shown in FIG. 1B, the front LiDAR unit 6 is provided on a back surface 52 of the vehicle body 50 that faces the road. In particular, the front LiDAR unit 6 is provided in a vicinity of rear ends of the pair of front tires 22 in the front-rear direction of the vehicle 1, and is provided in a vicinity of a center of the vehicle 1 in the left-right direction of the vehicle 1. More specifically, the front LIDAR unit 6 is provided in a vicinity of a virtual line L2 passing through the rear ends of the pair of front tires 22 in the front-rear direction, and is provided on a virtual line L1 passing through the center of the vehicle 1 in the left-right direction. For example, when an outer diameter of the front LiDAR unit 6 is 100 mm, a central axis 6x of the front LiDAR unit 6 may be located at a position 50 mm rearward from the virtual line L2.

The rear LiDAR unit 7 is configured to acquire point group data indicating the surrounding environment in the rear region of the vehicle 1. The rear LiDAR unit 7 is provided on the back surface 52 of the vehicle body 50. In particular, the rear LiDAR unit 7 is provided in a vicinity of rear ends of the pair of rear tires 26 in the front-rear direction, and is provided in the vicinity of the center of the vehicle 1 in the left-right direction. More specifically, the rear LiDAR unit 7 is provided in a vicinity of a virtual line L3 passing through the rear ends of the pair of rear tires 26 in the front-rear direction, and is provided on the virtual line L1. For example, when an outer diameter of the rear LiDAR unit 7 is 100 mm, a central axis 7x of the rear LiDAR unit 7 may be located at a position 50 mm rearward from the virtual line L3.

Since the front LiDAR unit 6 and the rear LiDAR unit 7 are provided on the back surface 52 of the vehicle body 50, the point group data acquired by the front LiDAR unit 6 and the rear LiDAR unit 7 shows the pair of front tires 22 and the pair of rear tires 26 as objects. Therefore, the vehicle control unit 3 functioning as the LiDAR control unit is configured to delete the information related to the pair of front tires 22 and the pair of rear tires 26 from the surrounding environment information of the vehicle 1 when acquiring the surrounding environment information based on the received point group data. In this way, since the information related to the front tires 22 and the rear tires 26 of the vehicle 1 is deleted from the surrounding environment information, it is possible to prevent these tires from being detected as objects that are present around the vehicle 1.

Figure 3:
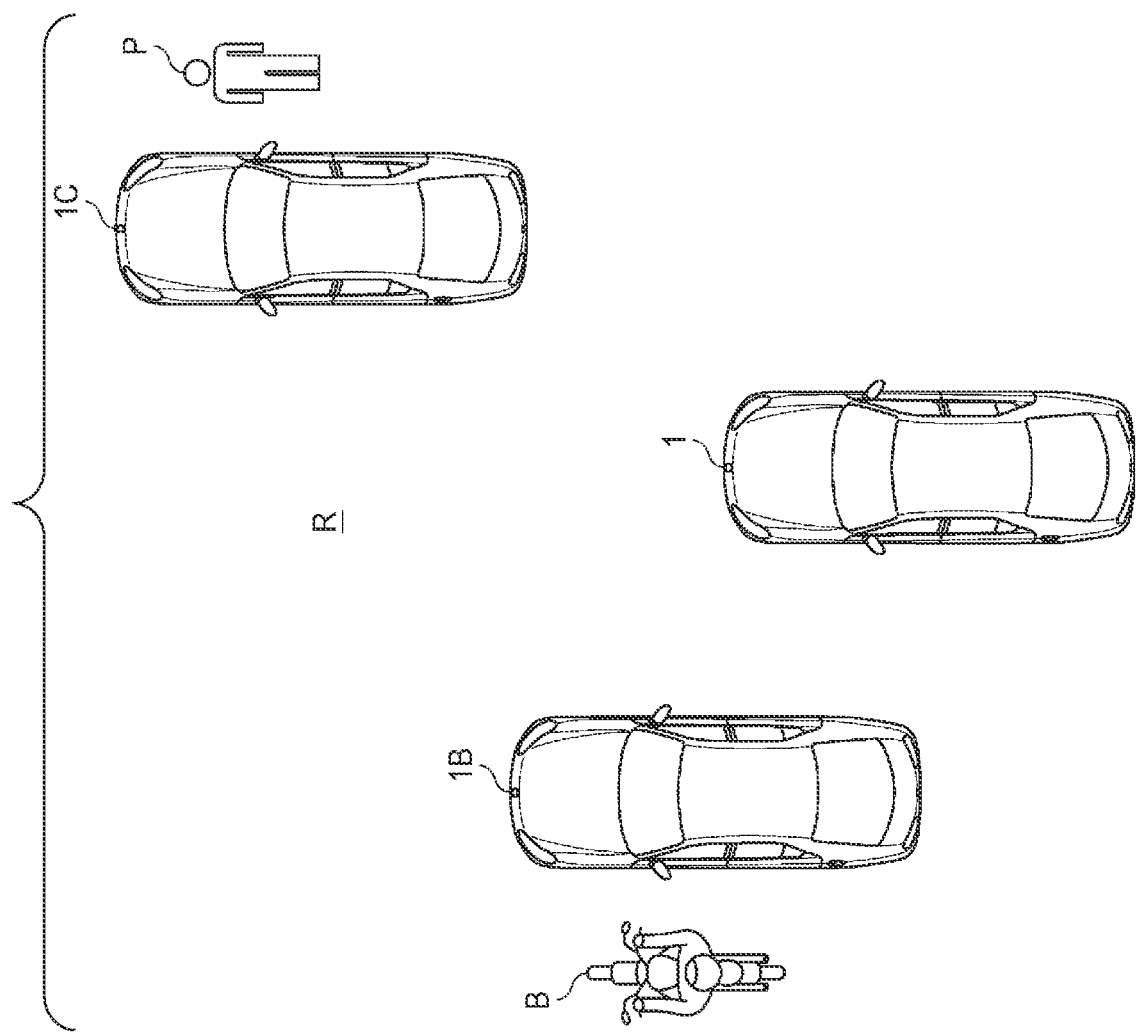
FIG. 3 is a view showing a pedestrian and a motorcycle that are present in a blind spot of the vehicle according to the present embodiment.

As described above, according to the present embodiment, since the front LiDAR unit 6 and the rear LiDAR unit 7 are provided on the back surface 52 of the vehicle body 50, the front LiDAR unit 6 and the rear LiDAR unit 7 can detect pedestrians, other vehicles, and the like present around the vehicle 1 through a space between the back surface 52 and the road. For example, as shown in FIG. 3, the front LiDAR unit 6 or the rear LiDAR unit 7 mounted on the vehicle 1 can detect a pedestrian P hidden behind a front vehicle 1C through a space between the vehicle 1 and a road R and a space between the front vehicle 1C and the road R. Further, the front LiDAR unit 6 or the rear LiDAR unit 7 can detect a motorcycle B hidden behind a front vehicle 1B through the space between the vehicle 1 and the road R and a space between the front vehicle 1B and the road R. In this way, it is possible to provide the sensing system 20 and the vehicle 1 that are capable of detecting an object hidden behind another vehicle.

In this regard, the vehicle control unit 3 can acquire information related to the front vehicles 1C, 1B based on the image data acquired by the front camera 4, but cannot acquire information related to the pedestrian P and the motorcycle B at a blind spot of the front camera 4. On the other hand, the vehicle control unit 3 can acquire the information related to the pedestrian P and the motorcycle B based on the point group data acquired by the front LiDAR unit 6 or the rear LiDAR unit 7. In this way, by using both the point group data and the image data, it is possible to improve the detection accuracy of the surrounding environment of the vehicle 1.

According to the present embodiment, the front LiDAR unit 6 is provided in the vicinity of the virtual line L2 and on the virtual line L1, and the rear LiDAR unit 7 is provided in the vicinity of the virtual line L3 and on the virtual line L. Therefore, when the two LiDAR units are provided on the back surface 52, it is possible to reduce a blind spot of a detection region formed by the two LiDAR units in the rear region of the vehicle 1.

In order to reduce a blind spot of a detection region formed by the two LiDAR units in the front region of the vehicle 1, the front LiDAR unit 6 may be provided on the virtual line L1 in a vicinity of a virtual line L4 passing through front ends of the pair of front tires 22. In this case, the rear LiDAR unit 7 may be provided on the virtual line L1 in a vicinity of a virtual line L5 passing through front ends of the pair of rear tires 26. In order to further reduce the blind spot of the detection region formed by the two LiDAR units in the front region of the vehicle 1, another LiDAR unit may be provided on the back surface 52.

Although the embodiment of the present invention has been described above, it is needless to say that the technical scope of the present invention should not be interpreted as being limited by the description of the present embodiment. It is to be understood by those skilled in the art that the present embodiment is merely an example and various modifications may be made within the scope of the invention described in the claims. The technical scope of the present invention should be determined based on the scope of the invention described in the claims and an equivalent scope thereof.

The present application appropriately incorporates the contents disclosed in Japanese Patent Application (Japanese Patent Application No. 2019-026547) filed on Feb. 18, 2019.

The invention claimed is:

1. A sensing system for a vehicle provided in a vehicle, the sensing system comprising
    at least one LiDAR unit provided on a back surface of a vehicle body facing a road and configured to acquire point group data indicating a surrounding environment of the vehicle; and
    a LiDAR control unit configured to acquire surrounding environment information of the vehicle based on the point group data acquired from the LiDAR unit,
    wherein the LiDAR control unit is configured to delete information related to a tire of the vehicle from the surrounding environment information.

2. The sensing system for a vehicle according to claim 1, further comprising
    at least one camera provided at a predetermined position of the vehicle body except for the back surface of the vehicle body and configured to acquire image data indicating a surrounding environment of the vehicle.

3. The sensing system for a vehicle according to claim 1, wherein the at least one LiDAR unit includes:
    a front LiDAR unit that is provided in a vicinity of a rear end of a pair of front tires of the vehicle in a front-rear direction of the vehicle and is provided in a vicinity of a center of the vehicle in a left-right direction of the vehicle, and
    a rear LiDAR unit that is provided in a vicinity of a rear end of a pair of rear tires of the vehicle in the front-rear direction and is provided in the vicinity of the center of the vehicle in the left-right direction.

4. A vehicle comprising the sensing system for a vehicle according to claim 1.

* * * * *